United States Patent
Mullins et al.

(10) Patent No.: US 12,555,094 B1
(45) Date of Patent: Feb. 17, 2026

(54) SYSTEMS AND METHODS FOR CUSTOMIZING AUTHENTICATION CREDENTIALS FOR A PAYMENT CARD

(71) Applicant: Wells Fargo Bank, N.A., San Francisco, CA (US)

(72) Inventors: Ashley Mullins, San Ramon, CA (US); Shalini Sahdeo, San Francisco, CA (US); Dorothy M. Scocci, San Ramon, CA (US); Katherine M. Yee, Orinda, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 430 days.

(21) Appl. No.: 17/588,643

(22) Filed: Jan. 31, 2022

Related U.S. Application Data (63) Continuation of application No. 14/980,246, filed on Dec. 28, 2015, now Pat. No. 11,238,441.

(51) Int. Cl.
  *G06Q 20/34* (2012.01)
  *G06Q 20/40* (2012.01)

(52) U.S. Cl.
  CPC ....... *G06Q 20/3552* (2013.01); *G06Q 20/341* (2013.01); *G06Q 20/4012* (2013.01)

(58) Field of Classification Search
  CPC ............ G06Q 20/3552; G06Q 20/341; G06Q 20/4012
  See application file for complete search history.

(56) References Cited

U.S. PATENT DOCUMENTS

| | | | |
|---|---|---|---|
| 6,422,462 B1 | 7/2002 | Cohen | |
| 7,383,213 B1 * | 6/2008 | Walter | G06Q 40/02 705/40 |
| 7,954,704 B1 * | 6/2011 | Gephart | G07F 7/1025 705/72 |
| 8,543,828 B2 | 9/2013 | Albisu | |
| 8,565,723 B2 | 10/2013 | Cox | |

(Continued)

OTHER PUBLICATIONS

Change RSA OTP Token PIN, 2013, Lawrence Livermore National Laboratory, https://access.llnl.gov/otp/cgi-bin/pinchg.cgi (Year: 2013).*

(Continued)

*Primary Examiner* — John W Hayes
*Assistant Examiner* — Taylor S Rak
(74) *Attorney, Agent, or Firm* — Foley & Lardner LLP (57) ABSTRACT

A method of customizing authentication credentials for a payment card includes providing, by a payment card configuration circuit of a financial institution computing system, a card configuration interface to a computing device of a customer, the customer having a payment card account maintained by the financial institution computing system, receiving, by the payment card configuration circuit, a request from the computing device to modify an authentication requirement for use of the payment card account, the request including an authentication credential, and assigning, by the payment card configuration circuit, the authentication credential to a payment card associated with the payment card account, wherein the authentication credential is useable to authenticate a user of the payment card.

20 Claims, 7 Drawing Sheets

(56) References Cited

U.S. PATENT DOCUMENTS

| | | | |
|---|---|---|---|
| 8,639,621 B1 * | 1/2014 | Ellis | G06Q 20/3224 |
| | | | 705/41 |
| 9,425,958 B2 | 8/2016 | Vennelakanti et al. | |
| 11,238,441 B1 * | 2/2022 | Mullins | G06Q 20/34 |
| 2004/0044739 A1 | 3/2004 | Ziegler | |
| 2005/0027713 A1 | 2/2005 | Cameron et al. | |
| 2006/0157553 A1 | 7/2006 | Kelley et al. | |
| 2011/0313870 A1 | 12/2011 | Eicher et al. | |
| 2012/0197794 A1 | 8/2012 | Grigg et al. | |
| 2013/0262317 A1 | 10/2013 | Collinge et al. | |
| 2014/0188719 A1 | 7/2014 | Poornachandran et al. | |
| 2016/0359837 A1 | 12/2016 | Krstic et al. | |
| 2018/0075450 A1 * | 3/2018 | Hurry | G06Q 20/3226 |

OTHER PUBLICATIONS

Google, Wallet Help, Google Wallet App Set Up, available at least as early as Jun. 2, 2015, 1 page.

* cited by examiner

SYSTEMS AND METHODS FOR CUSTOMIZING AUTHENTICATION CREDENTIALS FOR A PAYMENT CARD

CROSS-REFERENCE TO RELATED PATENT APPLICATIONS

This application is a continuation of U.S. patent application Ser. No. 14/980,246, filed Dec. 28, 2015, all of which is incorporated herein by reference in its entirety.

BACKGROUND

Payment cards (e.g., debit cards, credit cards, prepaid cards, etc.) may require an authentication credential (e.g., personal identification number, biometric data, signature, etc.) to authenticate a customer at a point-of-sale. The authentication credential is often randomly assigned to the payment card when the card is issued. To edit the authentication credential, a customer may be required to visit a branch location or automated teller machine ("ATM") operated by the issuing financial institution. Further, each payment card is typically associated with a single authentication credential that is required from all users of the card.

SUMMARY

One embodiment of the present disclosure relates to a method of customizing authentication credentials for a payment card. The method includes providing, by a payment card configuration circuit of a financial institution computing system, a card configuration interface to a computing device of a customer, the customer having a payment card account maintained by the financial institution computing system, receiving, by the payment card configuration circuit, a request from the computing device to modify an authentication requirement for use of the payment card account, the request including an authentication credential, and assigning, by the payment card configuration circuit, the authentication credential to a payment card associated with the payment card account, wherein the authentication credential is useable to authenticate a user of the payment card.

Another embodiment of the present disclosure relates to another method of customizing authentication credentials for a payment card. The method includes assigning, by a payment card configuration circuit of a financial institution computing system, a first authentication credential, including a first use parameter, to a payment card maintained by the financial institution computing system, assigning, by the payment card configuration circuit, a second authentication credential, including a second use parameter, to the payment card, receiving, by the payment card configuration circuit, a transaction request from a merchant to authorize a transaction from the payment card, the transaction request including one of the first authentication credential and the second authentication credential, and based on which of the authentication credentials is received, applying, by the payment card configuration circuit, the corresponding use parameter to the transaction.

Another embodiment of the present disclosure relates to an apparatus for customizing authentication credentials for a payment card. The apparatus includes a financial institution customer database that stores customer financial information, including information relating to a payment card account of a customer, a network interface circuit communicably coupled to the financial institution customer database and structured to communicate with a computing device of the customer, and a payment card configuration circuit communicably coupled to the financial institution customer database and the network interface circuit. The payment card configuration circuit is structured to provide a card configuration interface to the computing device of the customer via the network interface circuit, receive a request from the computing device to modify an authentication requirement for use of the payment card account, the request including an authentication credential, and assign, at the financial institution customer database, the authentication credential to a payment card associated with the payment card account, wherein the authentication credential is useable to authenticate a user of the payment card.

Another embodiment of the present disclosure relates to another apparatus for customizing authentication credentials for a payment card. The apparatus includes a financial institution customer database that stores customer financial information, including information relating to a payment card account of a customer, a network interface circuit communicably coupled to the financial institution customer database and structured to communicate with a computing device of the customer, and a payment card configuration circuit communicably coupled to the financial institution customer database and the network interface circuit. The payment card configuration circuit is structured to assign, at the financial institution customer database, a first authentication credential, including a first use parameter, to a payment card maintained by the financial institution computing system, assign, at the financial institution customer database, a second authentication credential, including a second use parameter, to the payment card, receive a transaction request from a merchant to authorize a transaction from the payment card, the transaction request including one of the first authentication credential and the second authentication credential, and based on which of the authentication credentials is received, apply the corresponding use parameter to the transaction.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

DETAILED DESCRIPTION

Figure 1:
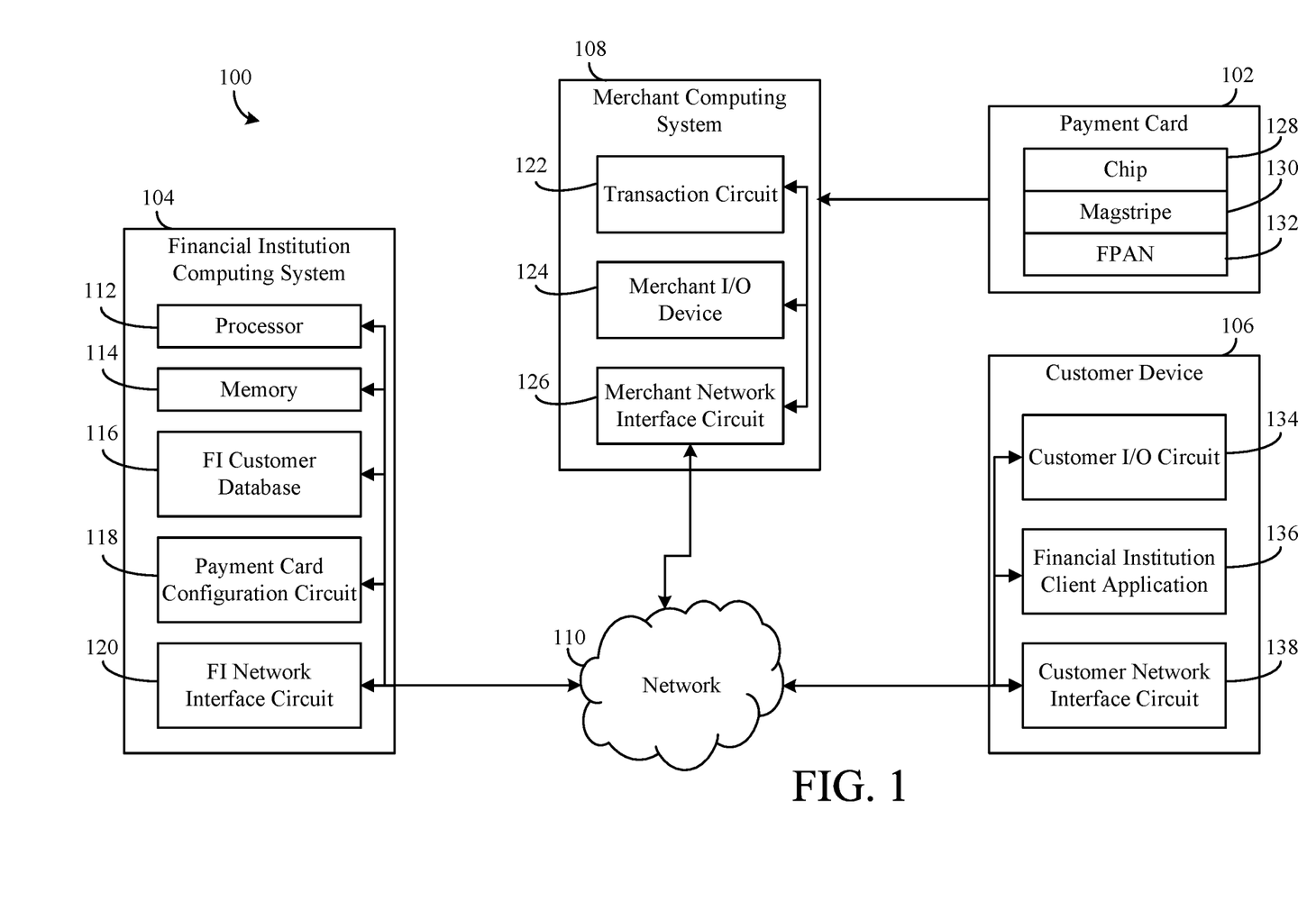
FIG. 1 is a schematic diagram of a network of computing systems, according to an example embodiment.

Referring to FIG. 1, a payment card configuration system 100 is shown, according to an example embodiment. The payment card configuration system 100 may be used to configure authentication credentials (e.g., personal identification numbers, biometric information, signatures) for payment card accounts of a customer. The customer may add, edit, and delete authentication credentials for the customer's accounts using the system 100. The system 100 may also be used to assign account profiles to the authentication credentials. The account profiles may be used to set use limits for a payment account (i.e., tied to a particular authentication credential). The account profiles may also be used to track spending for different persons or other spending categories.

The payment card configuration system 100 includes a payment card 102, a financial institution computing system 104, a customer device 106, and a merchant computing system 108. The financial institution computing system 104, the customer device 106, and the merchant computing system 108 are communicably coupled and configured to exchange data over a network 110. The network 110 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 110 includes the internet.

The financial institution computing system 104 is a computing system at a financial institution that is capable of maintaining financial accounts and databases of customer information. The financial institution maintains (e.g., issues, manages, etc.) one or more payment card accounts (e.g., debit card, credit card, prepaid card, etc.) for a customer associated with the customer device 106. In the context of the present disclosure, the financial institution can include commercial or private banks, credit unions, investment brokerages, or another financial institution capable of maintaining a customer payment card account.

The financial institution computing system 104 includes a processor 112, memory 114, and a financial institution customer database 116. The processor 112 may be an application specific integrated circuit (ASIC), one or more field programmable gate arrays (FPGAs), a digital signal processor (DSP), a group of processing components, or other suitable electronic processing components. The one or more memory devices 114 (e.g., RAM, ROM, NVRAM, Flash Memory, hard disk storage, etc.) stores data and/or computer code for facilitating at least some of the various processes described herein. The customer database 116 stores customer information and payment card account information associated with customer payment card accounts. For instance, the financial institution computing system 104 may store and manage authentication credentials for the customer payment card accounts, such as customer personal identification numbers (PINs), biometric data, security questions, and the like, any of which may be stored at the customer database 116. The financial institution computing system 104 may also store profile information associated with the payment card accounts, including use parameters (e.g., account limits) associated with the accounts.

The financial institution computing system 104 also includes a payment card configuration circuit 118 and a financial institution network interface circuit 120. The payment card configuration circuit 118 is communicably and operatively coupled to the customer database 116 and the network interface circuit 120. The payment card configuration circuit 118 is structured to configure (e.g., customize) authentication credentials, use parameters, and account profiles for a payment card account of a customer. The payment card configuration circuit 118 configures the customer's payment card account(s) in response to instructions received from the customer device 106. The network interface circuit 120 facilitates the sending and receiving of data, commands, instructions, values, etc. over the network 110 (e.g., to and from the merchant computing system 108, the customer device 106, etc.).

The customer device 106 is a computing system associated with a customer of the financial institution. The customer device 106 may be used by the customer to communicate with the financial institution computing system 104. The customer device 106 includes one or more processors, non-transitory storage mediums, and circuits configured to allow the customer device 106 to exchange data over the network 110, execute software applications, access websites, generate graphical user interfaces, and perform other similar functionalities. Examples of the customer device 106 include mobile devices such as laptop computers, tablets, smartphones, wearable computing devices (e.g., eyewear, a watch, bracelet, etc.), and the like, as well as desktop computers and other personal computing devices. Other examples of the customer device 106 include terminals (e.g., automated teller machines, point of sale devices) provided by at least one of the financial institution computing system 104 and the merchant computing system 108.

Figure 2:
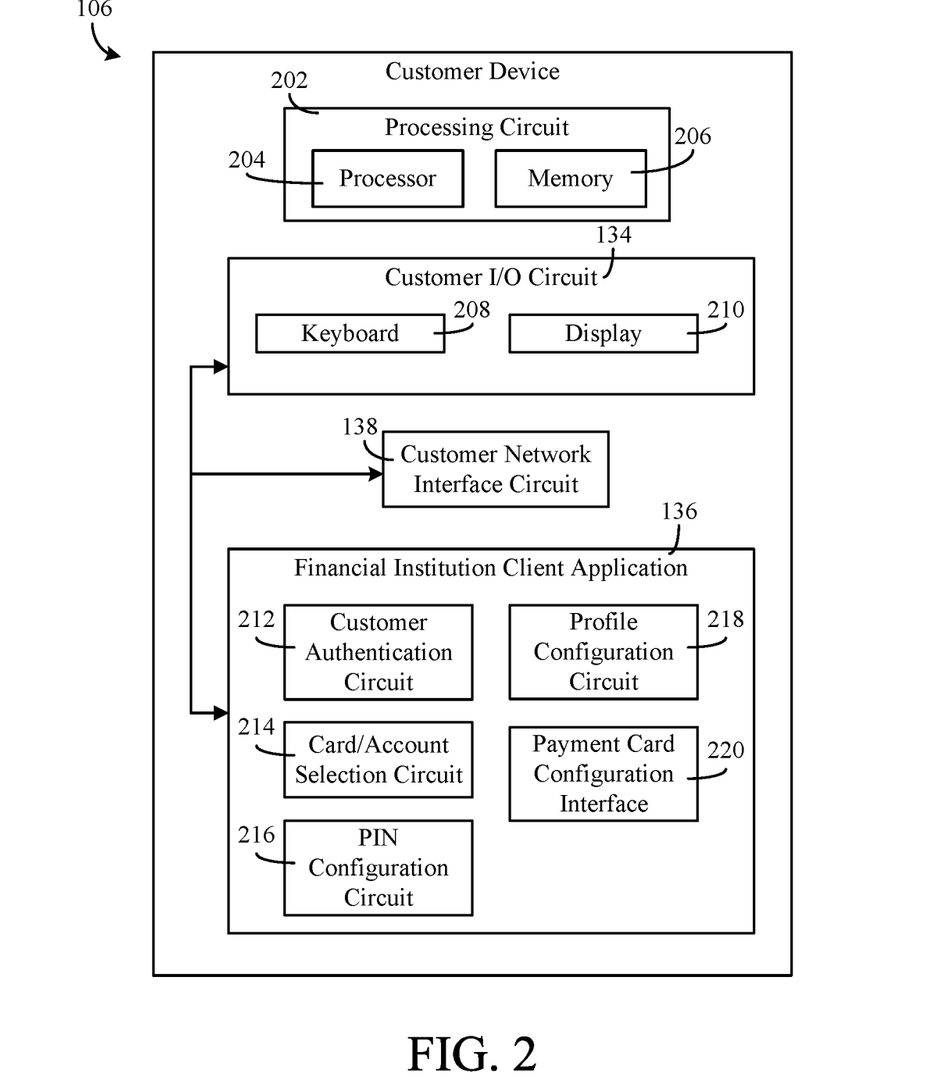
FIG. 2 is a schematic diagram of a customer device shown in FIG. 1, according to an example embodiment.

The customer device 106 includes a customer input/output ("I/O") circuit 134, a payment card configuration interface 220, and a customer network interface circuit 138. The I/O circuit 134 may be structured to receive and provide communication(s) to a customer associated with the device 106, or to another entity within the system 100. The I/O circuit 134 may also be structured to exchange data, communications, instructions, etc. with an input/output component of the device 106. Thus, the I/O circuit 134 may include one or more circuits for communicating with the input/output devices of the customer device 106. Examples of such circuits are shown in FIG. 2, and described in further detail below. The network interface circuit 138 facilitates the sending and receiving of data, commands, instructions, values, etc. over the network 110 (e.g., to and from the financial institution computing system 104, etc.).

The financial institution client application 136 is communicably coupled to the financial institution computing system 104 (e.g., the customer database 116) via the network 110 and structured to permit management of the customer's accounts. In one embodiment, the customer is required to first download the application 136 prior to its usage. In another embodiment, the application 136 is hard coded into the memory (e.g., memory 206) of the customer device 106. In still another embodiment, the application 136 is a web-based interface application such that the customer device 106 may provide a thin client (web browser) interface to application 136, which may be executed and maintained remotely. In such an instance, the customer may be required to log onto or access the web-based interface before usage of the application 136. Further and in this regard, the application 136 may be supported by a separate computing system comprising one or more servers, processors, network interface circuits, etc. that transmit the application 136 for use to the customer device 106. In certain embodiments, the application 136 includes an application programming interface (API) and/or a software development kit (SDK) that facilitates the integration of other applications with the financial institution client application 136. All such variations and combinations are intended to fall within the spirit and scope of the present disclosure.

The financial institution client application 136 permits management of the customer's payment card accounts. The application 136 may provide displays indicative of current payment card account balances, authentication requirements, profile information, account limits, and the like. Further, the application 136 may also permit the customer to customize the customer's payment card accounts, including the authentication requirements and usage limits associated with the accounts. For example, the application 136 may depict a payment card account of the customer and allow the customer to specify the PIN required at a point-of-sale to use the account. In another example, an option may be provided by the application 136 to add or modify customer profiles or usage limits associated with the account. The application 136 is described in further detail with reference to FIG. 2.

The financial institution client application 136 may be or include a banking application (e.g., a mobile banking application) structured to permit management of the customer's financial accounts. For instance, the application 136 may provide displays indicative of current account balances, pending transactions, profile information (e.g., contact information), and the like. Similarly, the financial institution client application 136 may also be or include a mobile wallet application that is provided by the financial institution computing system 104 and structured to facilitate purchases by the customer via the customer device 106 (e.g., via the application 136). Accordingly, the application 136 may be linked or otherwise connected with one or more financial accounts of the customer. For instance, when at a point-of-sale terminal (e.g., merchant I/O device 124), a customer may open the application 136 and provide a passcode (e.g., biometrics such as a thumbprint, a personal identification number (PIN), a password, etc.) to authenticate the customer and select the payment account desired (e.g., the payment card account associated with payment card 102). Via communication with the point-of-sale terminal (e.g., near field communication), payment information is provided and the payment is processed. An example of a mobile wallet application is disclosed in U.S. patent application Ser. No. 13/456,176, which is hereby incorporated by reference in its entirety.

The payment card 102 is associated with the payment card account (e.g., a credit card, a debit card, a stored value card, etc.) held by the customer and maintained by the financial institution computing system 104. The payment card 102 includes a chip 128, a magstripe 130, and a primary account number 132 (a "PAN"). The PAN 132 is an account number corresponding to the customer payment card account, and may be printed or embossed on the physical payment card 102 (e.g., along with a customer name, expiration date, security codes, etc.). The magstripe 130 is a magnetically-responsive strip disposed on the back face of the payment card 102. The magstripe 130 stores information related to the payment card account (e.g., a payment card account number, a customer name, expiration date, etc.). The chip 128 is a small circuitry system configured to exchange data with external systems (e.g., points of sale, personal computing devices, ATMs, etc.) via electrical contacts, RFID communication, NFC communication, or in another manner. The chip 128 can be configured to selectively transmit various types of information, including payment card information (e.g., account numbers, issuing entities, authentication requirements, and so on).

The merchant computing system 108 is a computing system associated with a merchant. The merchant may include any type of merchant capable of conducting a transaction with the customer via the customer's payment card account. Examples of merchants include, for example, retailers, wholesalers, marketplace operators, service providers (e.g., loan servicers, cleaning services, transportation providers, digital wallet services, and so on), non-product or non-service based entities (e.g., governmental or regulatory entities) and so on. The merchant may be an online merchant or a merchant having a physical (e.g., brick-and-mortar) store. The merchant computing system 108 is configured to exchange information with the customer (e.g., the customer device 106) and the financial institution computing system 104 to process a financial transaction initiated using the customer's payment card account.

The merchant computing system 108 includes a transaction circuit 122, a merchant input/output device 124, and a merchant network interface circuit 126. The transaction circuit 122 is structured to process a payment card transaction between the customer and the merchant. The transaction circuit 122 in some arrangements is a circuit configured to retrieve, authenticate, and utilize data from the payment card 102 in order to process the payment card transaction. The transaction circuit 122 is communicably coupled to the I/O device 124 and the merchant network interface circuit 126 in order to facilitate communication with the customer (e.g., to request information, to receive authentication credentials, etc.) and the financial institution computing system 104 (e.g., to complete the customer authentication process), respectively.

The merchant I/O device 124 may include any point-of-sale terminal configured to facilitate an information exchange between the customer and the merchant. An input aspect of the merchant I/O device 124 allows the merchant or a customer to provide information to the merchant computing system 108, and can include, for example, a card reader (e.g., a contact or contactless chip reader, an RF or NFC-based receiver, a magstripe reader, etc.), a mechanical keyboard, a touchscreen, a microphone, a camera, a fingerprint scanner, or any user input device engageable to the merchant computing system 108 (e.g., via USB, Bluetooth™, WiFi, and so on). In turn, an output aspect of the merchant I/O device 124 allows the merchant or the customer to receive information from the merchant computing system 108, and can include, for example, a digital display, a speaker, illuminating icons, LEDs, and so on. For online payment card transactions, the input/output device 124 may include a website or an application that processes and facilitates the payment card transaction.

The merchant network interface circuit 126 facilitates the sending and receiving of data, commands, instructions, values, etc. over the network 110. For example, where the transaction circuit 122 determines that an authentication process requires input from the financial institution computing system 104, the merchant network interface circuit 126 allows the transaction circuit 122 to exchange data with the financial institution computing system 104 remotely over the network 110. The network interface circuit 126 may also facilitate communication with the customer device 106. For instance, the network interface circuit 126 may exchange information with the customer device 106 in the context of an online transaction. The network interface circuit 126 may also receive authentication information from the customer device 106 (e.g., fingerprint scan, PIN, signature, etc.).

In operation at a physical location, the customer presents the payment card 102 to the merchant (e.g., via the merchant I/O device 124) to initiate a financial transaction. The merchant I/O device 124 (e.g., a card reader) retrieves information from the payment card 102 (e.g., from the magstripe 130 or chip 128). Based on the information provided by the payment card 102, the merchant computing system 108 requires authentication credentials from the customer. For example, a customer may be asked to provide a personal identification number (a "PIN"), biometric data (e.g., a fingerprint), an answer to a security question, or other authentication credentials to the merchant I/O device 124 before the customer is authenticated and/or the transaction is authorized. Once the authentication credentials are provided at the I/O device 124, the customer is authenticated by matching the credentials with information stored authentication information (e.g., information stored at the financial institution computing system 104, stored on the payment card 102, etc.).

Referring now to FIG. 2, the function and structure of the customer device 106 is shown in greater detail according to an example embodiment. The customer device 106 is shown to include various modules for completing at least some of the activities described herein. As shown, the customer device 106 includes a processing circuit 202, the I/O circuit 134, the financial institution client application 136, and the customer network interface circuit 138. While various circuits with particular functionality are shown in FIG. 2, it should be understood that the customer device 106 may include any number of circuits for completing the functions described herein. For example, multiple circuits and the associated activities may be combined as a single circuit, additional circuits with additional functionality may be included, etc.

The processing circuit 202 includes a processor 204 and a memory 206. The processor 202 may be implemented as an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 206 (e.g., RAM, NVRAM, ROM, Flash Memory, hard disk storage, etc.) may store data and/or computer code for facilitating the various processes described herein. Moreover, the one or more memory devices 206 may be or include tangible, non-transient volatile memory or non-volatile memory. Accordingly, the one or more memory devices 206 may include database components, object code components, script components, or any other type of information structure for supporting the various activities and information structures described herein.

The customer input/output circuit 134 is structured to exchange data, communications, instructions, etc. with an input/output component of the device 106. Thus, the input/output circuit 134 may include one or more circuits for communicating with the input/output devices of the customer device 106, including, for example, a mechanical keyboard, a touchscreen, a microphone, a camera, a fingerprint scanner, any user input device engageable to the customer device 106 via a USB, serial cable, Ethernet cable, and so on. As shown, the input/output circuit 134 includes a keyboard circuit 208 and a display circuit 210. The keyboard circuit 208 may include or be communicably coupled with a keyboard of the device 106. Similarly, the display circuit 210 may include or be communicably coupled with a display of the device 106. The keyboard circuit 208 and display circuit 210 may also include communication circuitry, machine-readable media, and/or any combination therewith for facilitating the exchange of information, data, values, and the like between the customer and the financial institution client application 136. As described herein below, the financial institution client application 136 may utilize one or more of these circuits to extract or provide details regarding the payment card account.

An example structure for the financial institution client application 136 is shown in FIG. 2. The financial institution client application 136 includes a customer authentication circuit 212, a card/account selection circuit 214, a credential configuration circuit 216, a profile configuration circuit 218, and a payment card configuration interface 220. Other embodiments may include more or less circuits without departing from the spirit and scope of the present disclosure. The financial institution client application 136 is structured to enable the customer to manage the payment card account associated with the payment card 102. The application 136 enables the customer to authenticate to the customer device 106, browse account information for one or more payment accounts held by the customer, modify authentication credentials (e.g., a PIN) associated with a payment card account, and to define profiles and associated limits for use of the payment card 102.

The customer authentication circuit 212 is structured to enable the customer to authenticate to the customer device 106. The customer authentication circuit 212 may receive authentication credentials (e.g., login information, username and password) from the customer via an input/output component (e.g., keyboard) of the customer device 106, then send the credentials to the financial institution computing system 104 to authenticate the customer to access the customer's payment card accounts.

The card/account selection circuit 214 is structured to enable the customer to select a payment card (e.g., payment card 102), or a payment card account associated with the payment card. For instance, the customer may have more than one payment card account that is accessible via the financial institution client application 136 (e.g., debit card, credit card, prepaid card, etc.). The card/account selection circuit 214 may be structured to communicate with the payment card configuration circuit 118 to access payment card account information for the customer.

The credential configuration circuit 216 is structured to enable the customer to configure (e.g., customize) the customer's authentication credentials. The customer may be able to add, edit, and delete authentication credentials relating to the customer's payment card account(s). The authentication credentials may include PINs or other alphanumeric codes, biometric information (e.g., fingerprint, face recognition, voice recognition, iris or retinal recognition, behavioral characteristics, etc.), signatures, or any other type of information that may be used to authenticate a customer. The authentication credentials may be provided using an input/output device of the customer device 106. The credential configuration circuit 216 is communicably coupled to the input/output circuit 134 to communicate the authentication credentials to the credential configuration circuit 216. The credential configuration circuit 216 may also be communicably coupled to the payment card configuration circuit 118 in order to send the authentication credentials to the financial institution computing system 104.

The profile configuration circuit 218 is structured to enable the customer to configure (e.g., customize) the customer's account profile(s). Account profiles may be added, edited, and deleted by the customer. The account profiles may also be assigned to an authentication credential such that an account profile is applied to any transaction using the corresponding authentication credential. The account profiles may include various use parameters for a payment card account, including a limit on the number of transactions, payment amount for the transaction, location limits (e.g., within 5 miles of home, within zip code, etc.), limits related to specific merchants (e.g., only useable at merchant ABC) or merchant types (e.g., only useable at gas stations), temporal limits (e.g., only useable for 2 hours), and the like. The account profiles may also be budget-related, such as to track spending for specific budget categories. For instance, each profile may be related to a different budget category, so that when a corresponding authentication credential is used, the transaction information is automatically associated with the selected profile. The profile configuration circuit 218 may also be communicably coupled both the I/O circuit 134 and the payment card configuration circuit 118.

The payment card configuration interface 220 is an interface configured to receive and display web pages (e.g., web pages provided on a customer I/O component prompting the user to configure the customer's payment card account) received from the financial institution computing system 104 (i.e., via the payment card configuration circuit 118) at the customer device 106. The payment card configuration interface 220 is shown in FIG. 2 as being embodied in the financial institution client application 136. In other embodiments, however, the payment card configuration interface 220 may be embodied as a separate application on the customer device 106 or embodied/included with a different application running on the customer device 106 (e.g., a mobile wallet application, a mobile banking application, etc.). The payment card configuration interface 220 may be structured to allow customers to communicate with the payment card configuration circuit 118. For example, the payment card configuration interface 220 may be structured as a user interface that permits the user to provide information that is communicated to the payment card configuration circuit 118 (e.g., authentication credentials, account parameters, profile information, etc.). Accordingly, the payment card configuration interface 220 may be structured as a thin-client application that facilitates the exchange of information, data, values, and the like between the customer device 106 and the payment card configuration circuit 118. In this regard, the customer may be required to provide one or more credentials to communicate with the payment card configuration circuit 118. Beneficially, if the customer device 106 is compromised (e.g., lost, stolen, etc.), information stored/maintained by the payment card configuration circuit 118 may be prevented from access due to such information not being hard coded into the memory of the customer device 106.

Figure 3:
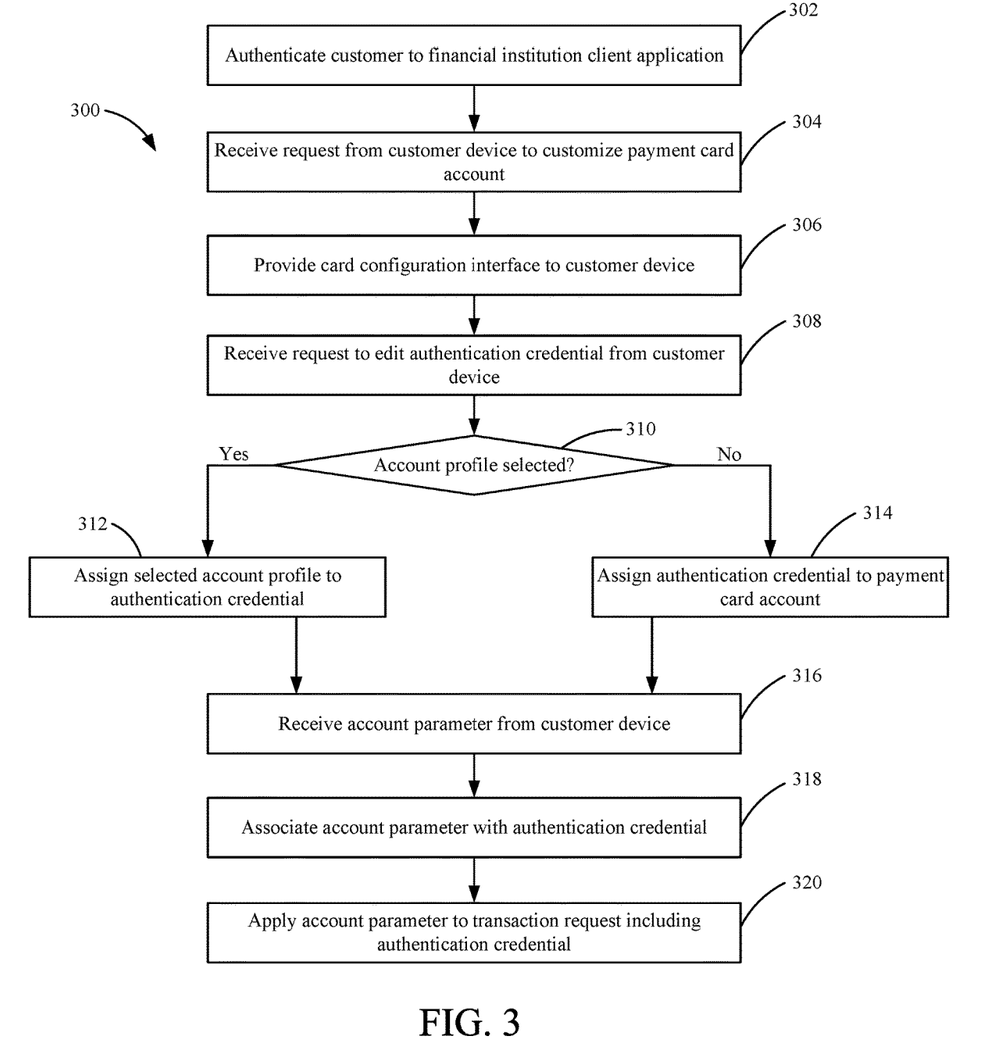
FIG. 3 is a schematic flow diagram of a process for configuring an authentication credential and use profile for a payment card account, according to an example embodiment.

Referring to FIG. 3, a flow diagram of a process 300 of customizing authentication credentials for a customer payment card account is shown, according to an example embodiment. The process 300 is performed by the financial institution computing system 104, including the financial institution customer database 116, the payment card configuration circuit 118, and the financial institution network interface circuit 120. The process 300 may be used to modify an authentication credential and associated use parameters for a payment card account based on input received from a customer via the customer device 106 (e.g., via the payment card configuration interface 220).

The process 300 begins when the financial institution computing system 104 authenticates the customer to access the financial institution client application 136 at 302. The financial institution computing system 104 may authenticate the customer in response to receiving authentication credentials (e.g., a username and password) from the customer using the customer device 106. As described above, the financial institution client application 136 may be downloaded to the customer device 106, hard coded into the memory of the customer device 106, provided to the customer device 106 via a web-based interface, or otherwise provided to the customer device 106. The financial institution client application 136 is communicably coupled to the financial institution computing system 104 via the network 110. The financial institution client application 136 permits management of the customer's payment card accounts. The application 136 may provide displays indicative of current payment card account balances, authentication requirements, profile information, account limits, and the like. Further, the application 136 may also permit the customer to customize the customer's payment card accounts, including the authentication requirements and usage parameters associated with the accounts.

After authenticating the customer to access the financial institution application 136, the financial institution receives a request from the customer device 106 to customize a payment card account of the customer at 304. The customer may send the request to the financial institution computing system 104 by interacting with a button or link within the application 136. For instance, a link may be provided within the application 136 to "Customize" or "Configure" the authentication credentials for the customer's payment card accounts.

Figure 6:
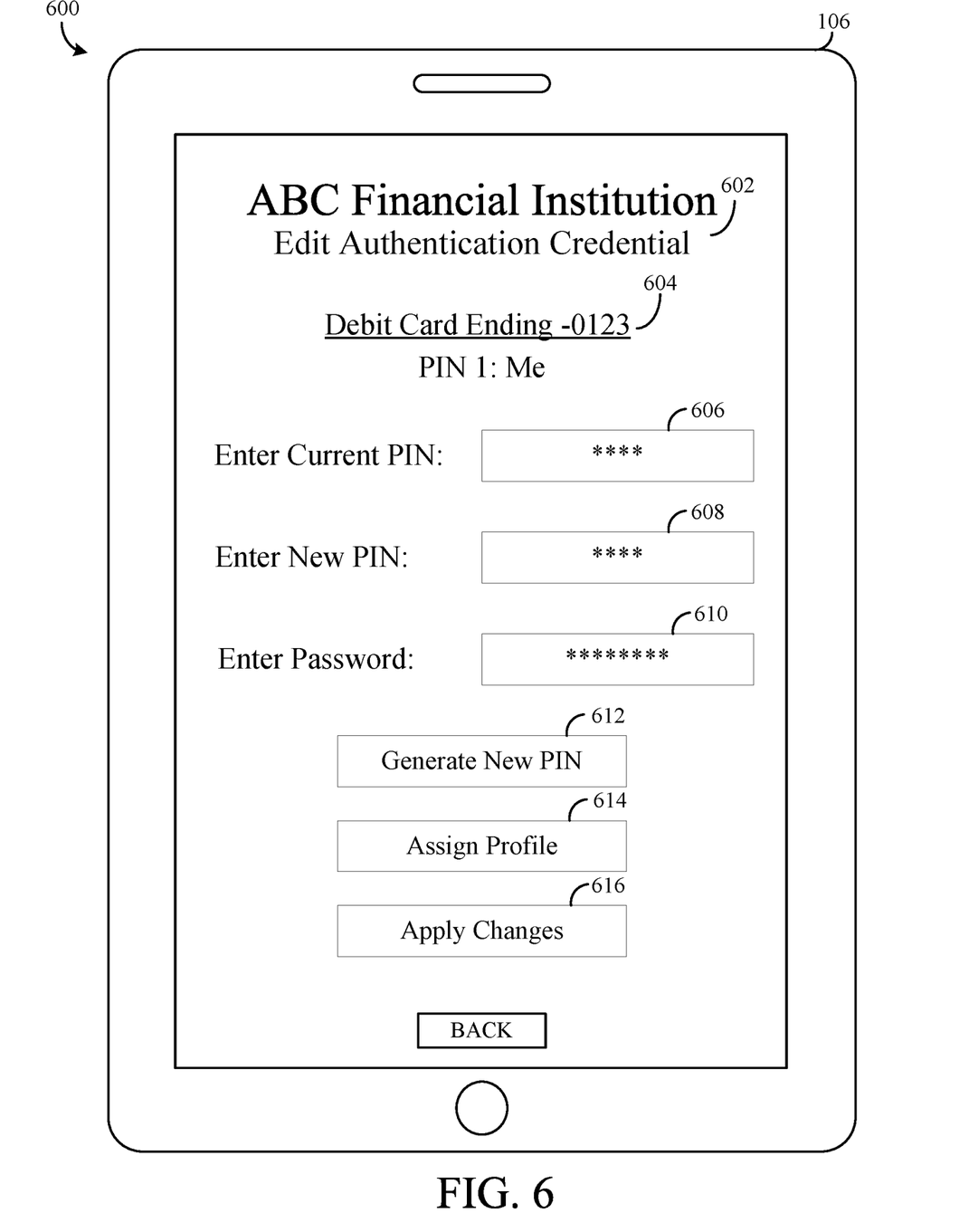
FIG. 6 is an interface that may be presented on a display of the customer device of FIG. 1 to enable the customer to customize a personal identification number associated with a payment card account, according to an example embodiment.
Figure 7:
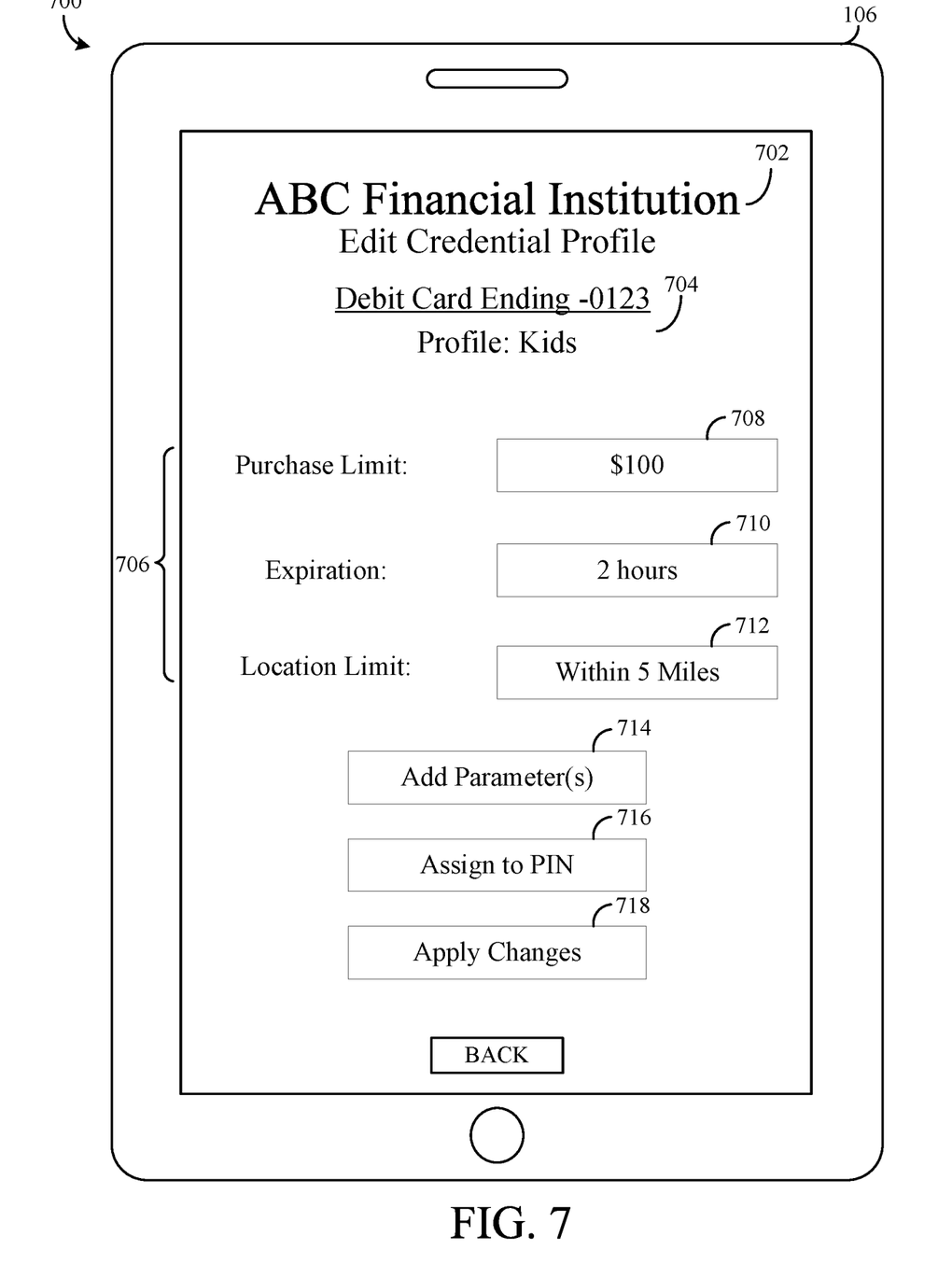
FIG. 7 is an interface that may be presented on a display of the customer device of FIG. 1 to enable the customer to set use parameters for an account profile associated with a payment card account, according to an example embodiment.

Upon receiving the request to customize the payment card account of the customer, the financial institution computing system 104 provides the payment card configuration interface 220 to the customer device 106 at 306. The payment card configuration interface 220 may be provided to the customer device 106 via the financial institution client application 136. The payment card configuration interface 220 is an interface configured to receive and display web pages (e.g., web pages provided on a customer I/O component prompting the user to configure the customer's payment card account) received from the financial institution computing system 104. The payment card configuration interface 220 is structured to allow customers to communicate with the payment card configuration circuit 118. Examples of the payment card configuration interface 220 are shown in FIGS. 5-7.

Figure 5:
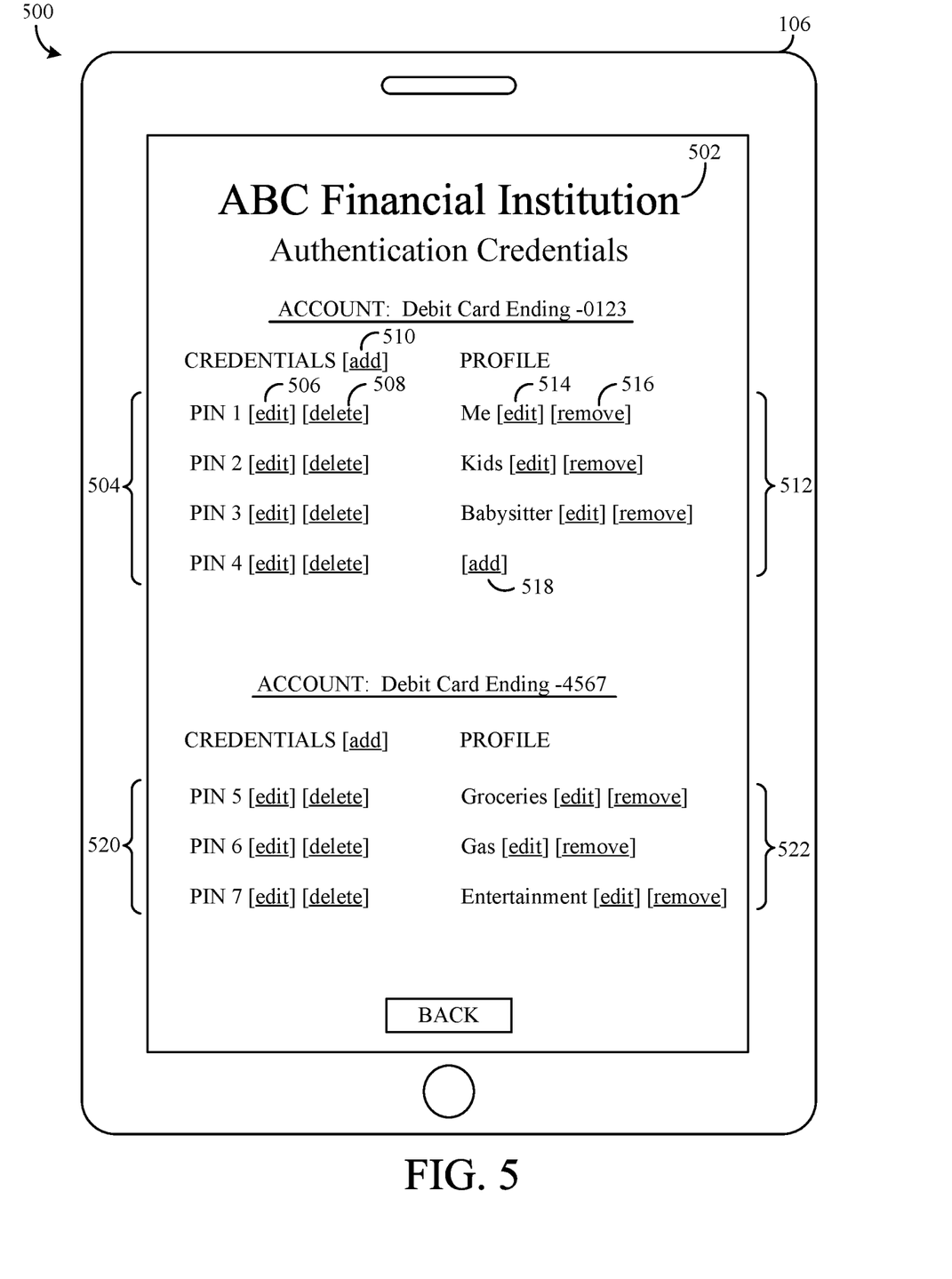
FIG. 5 is an interface that may be presented on a display of the customer device of FIG. 1 to enable a customer to configure authentication credentials for a payment card account, according to an example embodiment.

For example, FIG. 5 shows a customer interface 500 (i.e., customer display) that may be presented to the customer using the display circuit 210 of the customer device 106 at 306 of the process 300. An authentication credentials area 502 includes a first display of authentication credentials 504, which includes authentication credentials for a first debit card held by the customer. The authentication credentials 504 may have been selected by the customer using the application 136. The authentication credentials 504 may have also been provided by an issuing financial institution (e.g., financial institution computing system 104) upon issuance of the first debit card. In some embodiments, each of the authentication credentials can be used to transact using the same physical debit card (e.g., payment card 102). In other embodiments, the authentication credentials are merely tied to the same payment account, with more than one physical card being tied to the account. The authentication credentials 504 are shown as personal identification numbers (PINs) in FIG. 5, although in other embodiments the authentication credentials 504 may include biometric data, signature information, other alphanumeric codes, and the like. The customer can edit or delete one of the credentials 504 by interacting with links 506 and 508, respectively. The customer can add a credential associated with the first debit card by interacting with link 510.

The authentication credentials area 502 also includes a first display of profiles 512. The profiles 512 are each assigned to one of the authentication credentials 504. When one of the authentication credentials 504 is used in conjunction with the first debit card, the corresponding profile is applied to the transaction, including any transaction parameters or limits. For instance, the credential labeled "PIN 2" is assigned the profile labeled "Kids." When "PIN 2" is used to authenticate a user of the first debit card at a point of sale, the "Kids" profile is applied to the transaction. In this embodiment, the profiles 512 are labeled according to the intended user of the first debit card. For instance, the customer may provide "PIN 2" to the customer's children as an authentication credential for the first debit card so that any use parameters associated with the profile "Kids" are applied to the children's transactions. As an example, the "Kids" profile may include lower transactional limits or other restrictions suitable for children. The customer can edit or remove one of the profiles 512 by interacting with links 514 and 516, respectively. The customer can also add a profile by interacting with link 518.

Referring still to FIG. 5, the authentication credentials area 502 also includes a second display of authentication credentials 520 for a second debit card held by the customer, and a second display of profiles 522 assigned to the credentials 520. In this embodiment, the profiles 522 are labeled according to the intended use of the second debit card. For instance, the customer may utilize "PIN 5" as an authentication credential for a transaction related to "Groceries." The transaction may then be stored or otherwise associated with the profile "Groceries" so that the customer can track any transactions relating to groceries using the second debit card (e.g., to compare to a monthly budget for groceries). In other embodiments, the profiles may be otherwise named by the customer in order to identify or track the user of the payment card account, the type of purchase, or any other information related to a transaction.

Referring back to FIG. 3, the financial institution computing system 104 receives a request to edit an authentication credential from the customer device 106 at 308 of the process 300. The customer may send the request, including a desired authentication credential, using an interface 220 provided by the financial institution computing system 104 at the customer device 106.

FIG. 6, for example, shows a customer interface 600 (i.e., customer display) that may be presented to the customer to enable the customer to edit an authentication credential associated with a payment card account. The interface 600 may be presented to the customer when the customer interacts with one of the links 506 and 510 of interface 500. An edit authentication credential area 602 of the interface 600 includes a display of credential details 604 relating to one of the credentials 504 (i.e., "PIN 1"). The credential details 604 include identification of the associated payment card account (i.e., "Debit Card Ending -0123"), the name of the authentication credential (i.e., "PIN 1"), and identification of an associated profile (i.e., "Me").

The edit authentication credential area 602 also includes a field 606 for entering the current authentication credential (i.e., PIN 1) and a field 608 for entering a desired (new) authentication credential. If, rather than modifying the credential, the customer is adding a new authentication credential, the field 606 may not be included on interface 600. The area 602 also includes a field 610 for entering a password associated with the customer's account. The password may be required to authenticate the customer as a user having the authority to configure the payment card account. The customer can request that the financial institution computing system 104 (e.g., the payment card configuration circuit 118) generate a new authentication credential by interacting with button 612. The customer can assign (e.g., create) a profile to the authentication credential by interacting with button 614. The customer can apply the requested changes (e.g., send the request to the financial institution computing system 104) by interacting with button 616.

Referring again to FIG. 3, the financial institution computing system 104 determines at 310 if the customer has included a selection of an account profile along with the request. For instance, the customer may select an account profile when editing the authentication credential by interacting with the button 614 of interface 600. If an account profile selection is included with the request, the financial institution computing system 104 assigns the selected account profile to the authentication credential. The account profile and the associated authentication credential may be stored in the financial institution customer database 116, for instance. The selected account profile is then applied to any transaction using the authentication credential. If the customer does not select an account profile, the authentication credential is assigned generally to the payment card account at 314.

The financial institution computing system 104 receives an account parameter from the customer device 106 at 316. The customer may provide the account parameter to the financial institution computing system 104 using an interface provided by the financial institution computing system 104 at the customer device 106.

FIG. 7, for example, shows a customer interface 700 that may be presented to the customer to enable the customer to edit an account profile associated with a payment card account. The interface 700 may be presented to the customer when the customer interacts with one of links 514 and 518 of interface 500, for instance. An edit account profile area 702 of the interface 700 includes a display of profile information 704 relating to one of the profiles 512 (i.e., "Kids"). The profile information 704 includes information identifying the selected profile, including identification of the associated payment card account (i.e., "Debit Card Ending -0123") and the name of the account profile (i.e., "Kids").

The edit account profile area 702 also includes various account parameters 706 associated with the account profile. The account parameters 706 are applied to transactions associated with the selected account profile. In this embodiment, the account parameters 706 include a purchase limit, an expiration period, and a location limit for an associated transaction. The customer may edit a purchase limit associated with the account profile by interacting with field 708. The purchase limit may restrict the maximum purchase amount using the associated authentication credential. The customer may also edit an expiration period associated with the account profile by interacting with field 710. The expiration period may refer to a period after which the account profile, the associated authentication credential, and/or one of the account parameters expires. If the account profile expires, the associated authentication credential may return to a default setting. The customer may also edit a location limit associated with the account profile by interacting with field 712. The location limit may restrict the location (e.g., within 5 miles of home, within zip code 12345, etc.) in which the associated authentication credential can be used. In other embodiments, the edit account profile area 702 may include fields for account parameters, including any other parameters described herein. For instance, the customer may add an account parameter to the account profile by interacting with button 714. The customer may assign the selected account profile to an authentication credential (e.g., a PIN) by interacting with button 716. The customer may apply any changes made to the account profile (i.e., send the selected account parameters to the financial institution computing system 104) by interacting with button 718. The financial institution computing system 104 then receives the customer's account parameter at 316 of the process 300.

Referring again to FIG. 3, upon receiving the account parameter from the customer, the financial institution computing system 104 associates the account parameter (e.g., the account profile) with the authentication credential at 318 of the process 300. When a transaction is requested using the authentication credential to which the account parameter (e.g., the selected account profile) is assigned, the financial institution computing system 104 applies the account parameter to the transaction request at 320. For instance, if the account parameter is a purchase limit of $100, the financial institution computing system 104 determines whether the transaction request is over $100. If so, the financial institution computing system 104 does not authorize the transaction.

Figure 4:
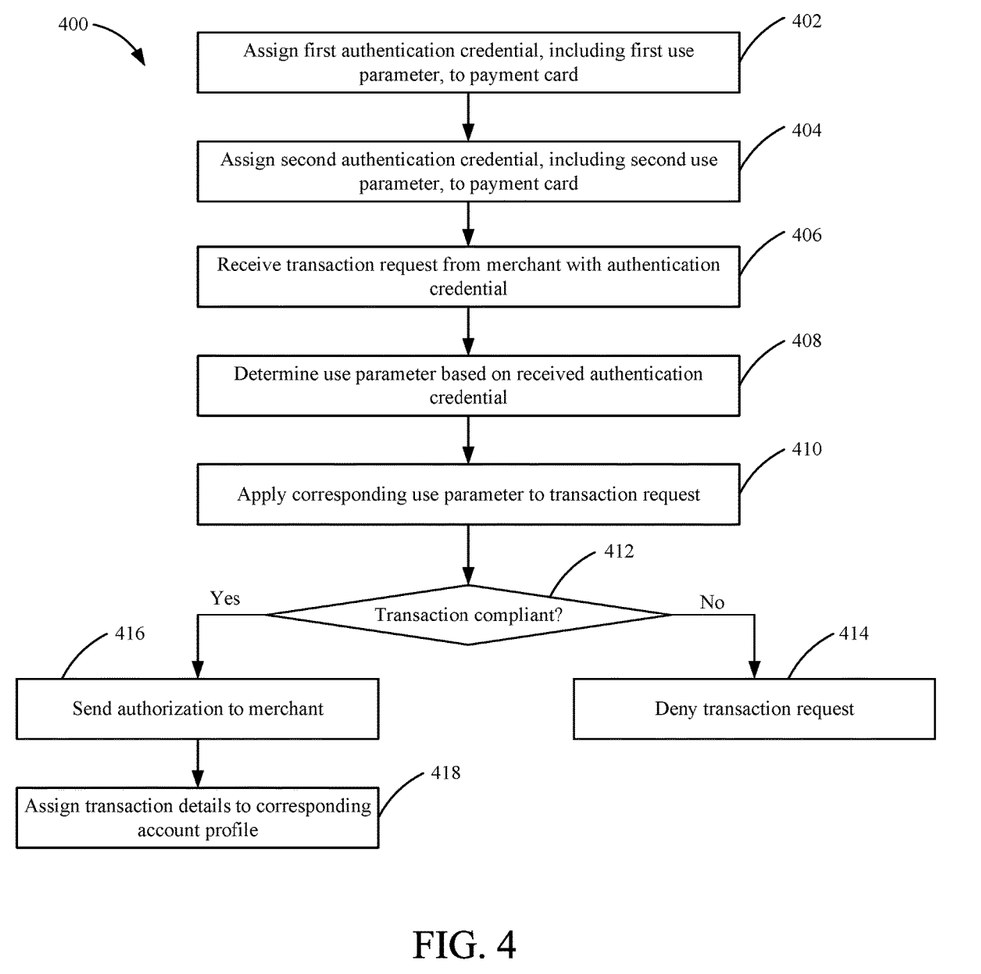
FIG. 4 is a schematic flow diagram of a process for applying customer-specified limits to a payment card transaction, according to an example embodiment.

Referring to FIG. 4, a flow diagram of a process 400 of applying customer-specified limits to a payment card transaction is shown, according to an example embodiment. The process 400 is performed by the financial institution computing system 104, including the financial institution customer database 116, the payment card configuration circuit 118, and the financial institution network interface circuit 120. The process 400 may be used to authorize a transaction request using a payment card having more than one authentication credential (and associated account parameter(s)).

The process 400 begins when the financial institution computing system 104 assigns a first authentication credential, including a first use parameter, to the payment card 102. The financial institution computing system 104 assigns a second authentication credential, including a second use parameter, to the payment card 102. The first and second authentication credentials may be any type of authentication credentials described herein, including a PIN, biometric information, signature, etc. The first and second authentication credentials are different from each other, but may both be used by the customer to request a transaction using the payment card 102. The first and second use parameters may be any type of account parameter described herein, including a limit on the number of transactions (e.g., a single-use authentication credential), a location-based transaction limit (e.g., useable for transactions within a certain geographic area), a limit related to the recipient (e.g., merchant) or type of recipient, a temporal account limit, or a limit on the purchase amount. The authentication credentials and the use parameters may be selected by the customer, and may be applied to the payment card 102 using the customer device 106 (as described above).

The financial institution computing system 104 receives a transaction request from a merchant (e.g., the merchant computing system 108) at 406. Along with the payment information, the transaction request includes one of the first authentication credential and the second authentication credential. In one example, the transaction request is initiated by the customer at a POS device of the merchant (e.g., merchant I/O device 124). In this example, the customer presents the payment card 102 to the merchant. The merchant reads information from the payment card and receives an authentication credential from the customer. The merchant computing system 108 then sends the authentication credential along with the payment information to the financial institution computing system 104 as part of a transaction request.

The financial institution computing system 104 determines the use parameter(s) to be applied to the transaction based on the authentication credential. The financial institution computing system 104 may consult customer information stored within the financial institution customer database 116 to determine the appropriate use parameter(s). In some embodiments, the authentication credential is assigned an account profile by the customer. In these embodiments, the financial institution computing system 104 determines the appropriate account profile to be applied to the transaction based on the authentication credential received. The financial institution computing system 104 then determines the use parameter(s) associated with the selected account profile. In the example embodiment, the financial institution computing system 104 selects the first use parameter if the first authentication credential is received, and the second use parameter if the second authentication credential is received.

If the received authentication credential includes an associated use parameter, the financial institution computing system 104 applies the corresponding use parameter to the transaction request at 410. The financial institution computing system 104 determines if the transaction request is compliant with the corresponding use parameter at 412. For instance, if the use parameter is a purchase limit for the payment card 102, the financial institution computing system 104 determines whether the transaction requested is for an amount greater than the purchase limit. The financial institution computing system 104 may also determine whether the transaction request is compliant with any other settings or parameters associated with the payment card 102, the authentication credential, and/or the associated account profile at this time.

If the transaction request is compliant with the corresponding use parameter, the financial institution computing system 104 denies the transaction request at 414. The financial institution computing system 104 sends an indication to the merchant computing system 108. The financial institution computing system 104 may also send an indication to the customer device 106. If the transaction request is compliant with the corresponding use parameter, the financial institution computing system 104 sends an authorization to the merchant computing system 108 at 416. The financial institution computing system 104 may also apply the transaction to the customer's payment card account. The financial institution computing system 104 assigns details of the transaction to the corresponding account profile at 418. For instance, the authentication credentials may be related to budget categories assigned by the customer. In such an example, the financial institution computing system 104 assigns the transaction amount to the appropriate budget category based on the authentication credential and/or an associated account profile.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g, flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
storing, by a financial institution computing system, in a database, a plurality of personal identification numbers (PINs) for authenticating transactions conducted using a payment card account, wherein each PIN of the plurality of PINs are associated with the payment card account;
receiving, by the financial institution computing system, from a thin-client application executing on a client device, an application programming interface (API) request transmitted to an API endpoint of the financial institution computing system, the API request comprising at least one authentication credential corresponding to the payment card account;
responsive to authenticating the thin-client application using the at least one authentication credential, providing, by the financial institution computing system, to the thin-client application executing on the client device, a first web page including a user interface comprising (i) a plurality of first links, each of the plurality of first links corresponding to a respective PIN of the plurality of PINs associated with the payment card account, and (ii) a second link corresponding to an account profile;
presenting, by the financial institution computing system, responsive to a first interaction with one of the plurality of first links corresponding to a first PIN of the plurality of PINs, a second web page in the thin-client application, the second web page comprising a set of fields to receive replacement PINS;
receiving, by the financial institution computing system, a first request to modify the first PIN of the plurality of PINs associated with the payment card account, the first request comprising (i) the first PIN, (ii) a replacement PIN, and (iii) a password that is required to authenticate a user of the client device as having authority to configure the payment card account, each of the first PIN, the replacement PIN, and the password specified via the set of fields, wherein the password is different from the first PIN, different from the replacement PIN, and different from the at least one authentication credential used to access the first web page;
authorizing the requested modification to the first PIN by authenticating, by the financial institution computing system, the password included in the first request;
responsive to authorizing the requested modification, replacing, by the financial institution computing system, the first PIN with the replacement PIN, such that the replacement PIN is associated with the payment card account;
receiving, by the financial institution computing system from a merchant computing device, a transaction request for a transaction, the transaction request identifying the payment card account and including the replacement PIN, the transaction request comprising biometric authentication information for the payment card account;
responsive to receiving the replacement PIN in the transaction request, authenticating, by the financial institution computing system, the user to perform the transaction using the biometric authentication information and corresponding authentication data stored in association with the payment card account;
applying, by the financial institution computing system, the transaction to the payment card account responsive to authenticating the user;
presenting, by the financial institution computing system, in response to a second interaction with the second link corresponding to the account profile, a third web page comprising at least one field configured to accept at least one restriction and an interactive element to assign a PIN to the account profile;
receiving, by the financial institution computing system, in response to a third interaction with the third web page displayed in the thin-client application, a second request comprising a second PIN of the plurality of PINs to assign to the account profile and the at least one restriction for the account profile;
assigning, by the financial institution computing system, the account profile to (i) the second PIN associated with the payment card account, and (ii) the restriction for the account profile;
determining, by the financial institution computing system, that the restriction for the account profile is to be applied to a second transaction request identifying the payment card account responsive to the second transaction request including the second PIN; and
denying, by the financial institution computing system, the second transaction request responsive to determining that the second transaction request does not satisfy the restriction.

2. The method of claim 1, further comprising:
receiving, by the financial institution computing system, a third request comprising a selection of a second account profile of the plurality of account profiles associated with the payment card account to assign to the replacement PIN; and
assigning, by the financial institution computing system, the second account profile to the replacement PIN associated with the payment card account.

3. The method of claim 2, further comprising:
receiving, by the financial institution computing system, a request to add a second restriction to the second account profile of the plurality of account profiles of the payment card account, the second restriction including at least one of a purchase limit, a location limit, or an expiration period; and
modifying, by the financial institution computing system, the second account profile by storing, in the database, the second restriction in association with the second account profile assigned to the replacement PIN.

4. The method of claim 3, further comprising:
retrieving, by the financial institution computing system, from the database and responsive to receiving the transaction request, the second restriction stored in association with the second account profile that is assigned to the replacement PIN included in the transaction request; and
determining, by the financial institution computing system, that the transaction request is compliant with the second restriction prior to applying the transaction to the payment card account.

5. The method of claim 3, further comprising transmitting, by the financial institution computing system to the merchant computing device, an indication that the transaction request is compliant with the second restriction.

6. The method of claim 3, further comprising:
receiving, by the financial institution computing system from the merchant computing device, a third transaction request for a third transaction, the third transaction request identifying the payment card account and including the replacement PIN;
retrieving, by the financial institution computing system, from the database and responsive to receiving the third transaction request, the second restriction stored in association with the second account profile that is assigned to the replacement PIN included in the third transaction request;
determining, by the financial institution computing system, that the third transaction request is not compliant with the second restriction; and
denying, by the financial institution computing system, the third transaction request responsive to determining that the third transaction request is not compliant with the second restriction.

7. The method of claim 4, further comprising:
identifying, by the financial institution computing system, a budget category associated with the second account profile; and
assigning, by the financial institution computing system, an amount of the transaction to the budget category.

8. The method of claim 1, wherein the payment card account is linked to a debit card associated with the financial institution computing system.

9. The method of claim 1, wherein the first request, including the first PIN, is received by the financial institution computing system via a card configuration interface.

10. The method of claim 1, further comprising assigning, by the financial institution computing system, the transaction to a second account profile based on the first PIN.

11. An apparatus, comprising:
a financial institution customer database that stores a plurality of personal identification numbers (PINs) for authenticating transactions conducted using a payment card account, wherein each PIN of the plurality of PINs are associated with the payment card account;
a network interface circuit communicably coupled to the financial institution customer database and structured to communicate with a client device; and
a financial institution computing system communicably coupled to the financial institution customer database and the network interface circuit, the financial institution computing system configured to:
receive, from a thin-client application, an application programming interface (API) request transmitted to an API endpoint of the financial institution computing system, the API request comprising at least one authentication credential corresponding to the payment card account;
responsive to authenticating the thin-client application using the at least one authentication credential, provide, to the thin-client application executing on the client device, a first web page including a user interface comprising (i) a plurality of first links, each of the plurality of first links corresponding to a respective PIN of the plurality of PINs associated with the payment card account, and (ii) a second link corresponding to an account profile;
present, responsive to a first interaction with one of the plurality of first links corresponding to a first PIN of the plurality of PINs, a second web page in the thin-client application, the second web page comprising a set of fields to receive replacement PINS;
receive a first request to modify the first PIN of the plurality of PINs stored in association with the payment card account, the first request comprising (i) the first PIN, (ii) a replacement PIN, and (iii) a password that is required to authenticate a user of the client device as having authority to configure the payment card account, each of the first PIN, the replacement PIN, and the password specified via the set of fields, wherein the password is different from the first PIN and different from the replacement PIN;
authorize the requested modification to the first PIN by authenticating the password included in the first request;
replace the first PIN with the replacement PIN responsive to authorizing the requested modification, such that the replacement PIN is associated with the payment card account;
receive, from a merchant computing device, a transaction request for a transaction, the transaction request identifying the payment card account and including the replacement PIN, the transaction request comprising biometric authentication information for the payment card account;
authenticate the user to perform the transaction using the biometric authentication information and corresponding authentication data stored in association with the payment card account;
apply the transaction to the payment card account responsive to authenticating the user;
present, in response to a second interaction with the second link corresponding to the account profile, a third web page comprising at least one field configured to accept at least one restriction and an interactive element to assign a PIN to the account profile;
receive, in response to a third interaction with the third web page displayed in the thin-client application, a second request comprising a second PIN of the plurality of PINs to assign to the account profile and the at least one restriction for the account profile;
assign the account profile to (i) the second PIN associated with the payment card account, and (ii) the restriction for the account profile;
determine that the restriction for the account profile is to be applied to a second transaction request identifying the payment card account responsive to the second transaction request including the second PIN; and
deny the second transaction request responsive to determining that the second transaction request does not satisfy the restriction.

12. The apparatus of claim 11, wherein the financial institution computing system is further configured to:
receive a third request comprising a selection of a second account profile of the plurality of account profiles associated with the payment card account to assign to the replacement PIN; and
assign the second account profile to the replacement PIN associated with the payment card account.

13. The apparatus of claim 12, wherein the financial institution computing system is further configured to:
receive a third transaction request from the merchant computing device to authorize a third transaction from the payment card account, wherein the third transaction request includes the replacement PIN; and assign the third transaction to the second account profile at the financial institution customer database based on the replacement PIN.

14. The apparatus of claim 12, wherein the financial institution computing system is further configured to:
   receive a request to add a second restriction to the second account profile of the plurality of account profiles, the second restriction including at least one of a purchase limit, a location limit, or an expiration period; and
   modify the second account profile by storing, in the financial institution customer database, the second restriction in association with the second account profile assigned to the replacement PIN.

15. The apparatus of claim 14, wherein the financial institution computing system is further configured to:
   retrieve, from the financial institution customer database and responsive to receiving the transaction request, the second restriction stored in association with the second account profile that is assigned to the replacement PIN included in the transaction request; and
   determine that the transaction request is compliant with the second restriction prior to applying the transaction to the payment card account.

16. The apparatus of claim 14, wherein the financial institution computing system is further configured to transmit, to the merchant computing device, an indication that the transaction request is compliant with the second restriction.

17. The apparatus of claim 14, wherein the financial institution computing system is further configured to:
   receive, from the merchant computing device, a third transaction request for a third transaction, the third transaction request identifying the payment card account and including the replacement PIN;
   retrieve, from the financial institution customer database and responsive to receiving the third transaction request, the second restriction stored in association with the second account profile that is assigned to the replacement PIN included in the third transaction request;
   determine that the third transaction request is not compliant with the second restriction; and
   deny the third transaction request responsive to determining that the third transaction request is not compliant with the second restriction.

18. The apparatus of claim 11, wherein the payment card account is linked to a debit card.

19. The apparatus of claim 11, wherein the financial institution computing system is communicably coupled to a card configuration interface, and wherein the financial institution computing system is configured to receive the first request via the card configuration interface.

20. The apparatus of claim 11, wherein the financial institution computing system is further configured to assign the transaction to a second account profile based on the first PIN.

* * * * *